United States Patent
Zavadsky et al.

(10) Patent No.: US 8,626,245 B2
(45) Date of Patent: *Jan. 7, 2014

(54) SYSTEMS AND METHODS FOR DISTRIBUTED ANTENNA SYSTEM REVERSE PATH SUMMATION USING SIGNAL-TO-NOISE RATIO OPTIMIZATION

(71) Applicant: ADC Telecommunications, Inc., Shakopee, MN (US)

(72) Inventors: Dean Zavadsky, Shakopee, MN (US); Philip M. Wala, Savage, MN (US); Jeffrey J. Cannon, Victoria, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,654

(22) Filed: May 6, 2013

(65) Prior Publication Data

US 2013/0252651 A1    Sep. 26, 2013

Related U.S. Application Data

(63) Continuation of application No. 12/814,896, filed on Jun. 14, 2010, now Pat. No. 8,509,850.

(51) Int. Cl.
*H04B 7/00* (2006.01)
*H04B 1/06* (2006.01)

(52) U.S. Cl.
USPC ............... 455/562.1; 455/561; 455/426.1; 455/127.2; 455/524; 455/138; 455/355

(58) Field of Classification Search
USPC ........... 455/136–140, 232.1, 296, 303, 308
See application file for complete search history.

(56) References Cited

U.S. PATENT DOCUMENTS

| 3,685,047 | A | 8/1972 | Sherer et al. |
| 4,697,236 | A | 9/1987 | Butts et al. |
| 5,280,472 | A | 1/1994 | Gilhousen et al. |
| 5,519,691 | A | 5/1996 | Darcie et al. |
| 5,969,837 | A | 10/1999 | Farber et al. |
| 6,801,767 | B1 | 10/2004 | Schwartz et al. |
| 7,103,377 | B2 | 9/2006 | Bauman et al. |
| 7,171,244 | B2 | 1/2007 | Bauman |

(Continued)

FOREIGN PATENT DOCUMENTS

GB    2354674    3/2001

OTHER PUBLICATIONS

U.S. Patent and Trademark Office, Notice of Allowance, U.S. Appl. No. 12/814,896, Jan. 24, 2013, pp. 1-14.

(Continued)

*Primary Examiner* — Gennadiy Tsvey
(74) *Attorney, Agent, or Firm* — Fogg & Powers LLC (57) ABSTRACT

Systems and methods for distributed antenna system reverse path summation using signal-to-noise ratio optimization are provided. In one embodiment, a method for reverse path summation for a distributed antenna system comprises: normalizing an uplink noise floor for a plurality of remote antenna units of a distributed antenna system, wherein the uplink noise floor is normalized based on a first remote antenna unit having a lowest noise floor of the plurality of remote antenna units; and scaling an uplink output gain of each of the plurality of remote antenna units by a scaling factor, wherein the scaling factor attenuates the uplink output gain based on a composite maximum host peak power for a host unit coupled to the plurality of remote antenna units.

21 Claims, 8 Drawing Sheets

(56) References Cited

U.S. PATENT DOCUMENTS

| | | |
|---|---|---|
| 7,184,728 B2 | 2/2007 | Solum |
| 7,590,354 B2 | 9/2009 | Sauer et al. |
| 7,599,711 B2 | 10/2009 | Hermel et al. |
| 7,627,250 B2 | 12/2009 | George et al. |
| 7,787,854 B2 | 8/2010 | Conyers et al. |
| 7,805,073 B2 | 9/2010 | Sabat, Jr. et al. |
| 7,848,654 B2 | 12/2010 | Sauer et al. |
| 7,961,689 B2 | 6/2011 | Stratford |
| 8,010,116 B2 | 8/2011 | Scheinert |
| 8,111,998 B2 | 2/2012 | George et al. |
| 8,310,963 B2 | 11/2012 | Singh |
| 8,346,091 B2 | 1/2013 | Kummertz et al. |
| 2001/0046840 A1 | 11/2001 | Kim |
| 2003/0045284 A1 | 3/2003 | Copley et al. |
| 2004/0125897 A1 | 7/2004 | Ariyavisitakul et al. |
| 2006/0253872 A1 | 11/2006 | Shoji et al. |
| 2008/0014948 A1 | 1/2008 | Scheinert |
| 2008/0058018 A1 | 3/2008 | Scheinert |
| 2008/0075158 A1 | 3/2008 | Li |
| 2008/0174502 A1 | 7/2008 | Oren et al. |
| 2009/0054105 A1 | 2/2009 | Hermel |
| 2009/0238573 A1 | 9/2009 | Bauman |
| 2010/0135437 A1 | 6/2010 | Lee et al. |
| 2011/0063169 A1 | 3/2011 | Chen et al. |
| 2011/0135013 A1 | 6/2011 | Wegener |

OTHER PUBLICATIONS

U.S. Patent and Trademark Office, Office Action, U.S. Appl. No. 12/814,896, Aug. 23, 2012, pp. 1-34.

International Preliminary Examining Authority, International Preliminary Report on Patentability, from Foreign Counterpart of U.S. Appl. No. 12/814,896, Dec. 27, 2012, pp. 1-6, Published in: WO.

International Searching Authority, International Search Report and Written Opinion, from Foreign Counterpart of U.S. Appl. No. 12/814,896, Jan. 17, 2012, pp. 1-10, Published in: WO.

```
Max_Host_Pwr_W           = .001*10^(Max_Host_Pwr_dBm/10)
NF_RAU2_RAU1_delta       = NF_RAU2 - NF_RAU1
Max_Comp_Pwr_W           = Max_Host_Power_W*[(RAU1) + (RAU2*10^(-NF_SP_RAU1_delta/10))]
Max_Comp_Pwr_dBm         = 10*log10(Max_Comp_Pwr_W/.001)

RAU2_Gain_adj_dB         = Gain_RAU2_dB - NF_RAU2_RAU1_delta - Max_Comp_Pwr_dBm
RAU2_Max_Pwr_dBm         = RAU2_Gain_adj_dB - Gain_RAU2_dB
RAU2_Noise_Pwr_dBm       = -174 + RAU2_Gain_adj_dB + NF_RAU2
RAU2_SNR_dB              = RAU2_Max_Pwr_dBm - RAU2_Noise_Pwr_dBm RAU1_Gain_adj_dB         = Gain_RAU1_dB - Max_Comp_Pwr_dBm
RAU1_Max_Pwr_dBm         = RAU1_Gain_adj_dB - Gain_RAU1_dB;
RAU1_Noise_Pwr_dBm       = -174 + RAU1_Gain_adj_dB + NF_RAU
RAU1_SNR_dB              = RAU1_Max_Pwr_dBm - RAU1_Noise_Pwr_dBm Host_Pwr_W               = .001*(RAU2*10^(RAU2_Max_Pwr_dBm/10) +
                           RAU1*(10^RAU1 Max_Pwr_dBm/10));
Host_Pwr_dBm             = 10*log10(Host_Pwr_W/.001)
Host_Noise_Pwr_W         = .001*(RAU1*10^(RAU1_Noise_Pwr_dBm/10) +
                           RAU2*(10^RAU2_Noise_Pwr_dBm/10));
Host_Noise_Pwr_dBm       = 10*log10(Host_Noise_Pwr_W/.001)
System_SNR_dB            = Host_Pwr_dBm - Host_Noise_Pwr_dBm
```

SYSTEMS AND METHODS FOR DISTRIBUTED ANTENNA SYSTEM REVERSE PATH SUMMATION USING SIGNAL-TO-NOISE RATIO OPTIMIZATION

CROSS-REFERENCE TO RELATED APPLICATION

This application is a continuation application of U.S. application Ser. No. 12/814,896, filed on Jun. 14, 2010 (pending), and entitled "SYSTEMS AND METHODS FOR DISTRIBUTED ANTENNA SYSTEM REVERSE PATH SUMMATION USING SIGNAL-TO-NOISE RATIO OPTIMIZATION," which is hereby incorporated herein by reference.

BACKGROUND

Distributed antenna systems are used in simulcast applications such as cellular communications. Typically, a plurality of remote antenna units (RAUs) are coupled to a common host unit via a fiber optic network using, for example, a daisy chain, cascade, star, or hybrid configuration. In the downlink direction, simulcast operation is straightforward, as the host unit sends a digitized RF signal out to the RAUs and each RAU transmits the same RF signal. The host unit is therefore fully in control of the power and other transmission parameters for downlink simulcast operation. In the uplink direction, each RAU receives wireless RF signals. Uplink simulcast operation involves the summing of the digitized RF signals from each RAU so that the host unit receives a single composite signal. The goal is for the host unit to be able to process the single composite signal as if it were a signal received from a single antenna. However, the host unit does not have complete control of the power of the wireless RF signals being received at the RAUs. For example, the location of particular handset unit transmitting to an RAU will affect the power of the signal received at the RAU. Further, the RAU network topology will affect how signals from different RAUs are summed together affecting the relative gain of the digital RF signals received at the host unit. Schemes for normalizing the digital RF signal components within the composite signal received at the host become even more complicated when the RAU network comprises a non-homogenous set of RAU equipment such that signal-to-noise ratios, noise factors, and other parameters, are not uniform throughout the RAU network.

For the reasons stated above and for other reasons stated below which will become apparent to those skilled in the art upon reading and understanding the specification, there is a need in the art for improved systems and methods for reverse path signal summation for uplink simulcast systems.

SUMMARY

The Embodiments of the present invention provide methods and systems for reverse path summation and will be understood by reading and studying the following specification.

In one embodiment, a method for reverse path summation for a distributed antenna system comprises: normalizing an uplink noise floor for a plurality of remote antenna units of a distributed antenna system, wherein the uplink noise floor is normalized based on a first remote antenna unit having a lowest noise floor of the plurality of remote antenna units; and scaling an uplink output gain of each of the plurality of remote antenna units by a scaling factor, wherein the scaling factor attenuates the uplink output gain based on a composite maximum host peak power for a host unit coupled to the plurality of remote antenna units.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for adjusting reverse path gains at remote antenna units for the optimization of dynamic range in any simulcast configuration. Embodiments of the present invention address the issue of providing optimal signal to noise ratio (SNR) summation for distributed antenna system remote antenna units in cascade, star, or other hybrid configurations, for any number of non-homogenous remote antenna units, with any given noise factor (NF) and gain. Further, as detailed below, by performing a digital attenuation of wireless RF signals, prior to their summation with other signals, embodiments of the present invention also provide for a lowered likelihood of digital overflow for properly provisioned real-work installation. Further, embodiments of the present invention maintain high SNR while equal-weigh balancing the SNR of each RAU individually, which benefits the performance of the composite uplink signal received at the host unit.

Figure 1A:
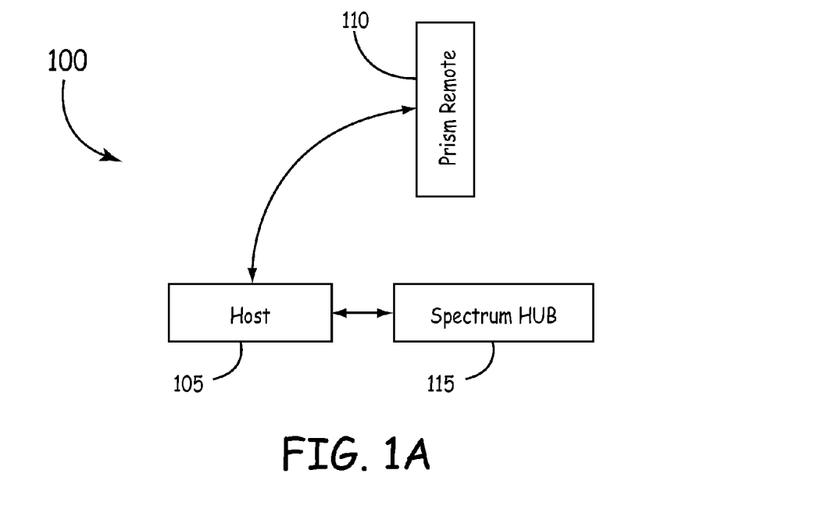
FIG. 1A illustrates a configuration of a two remote antenna unit distributed antenna system of one embodiment of the present invention.
Figure 1B:
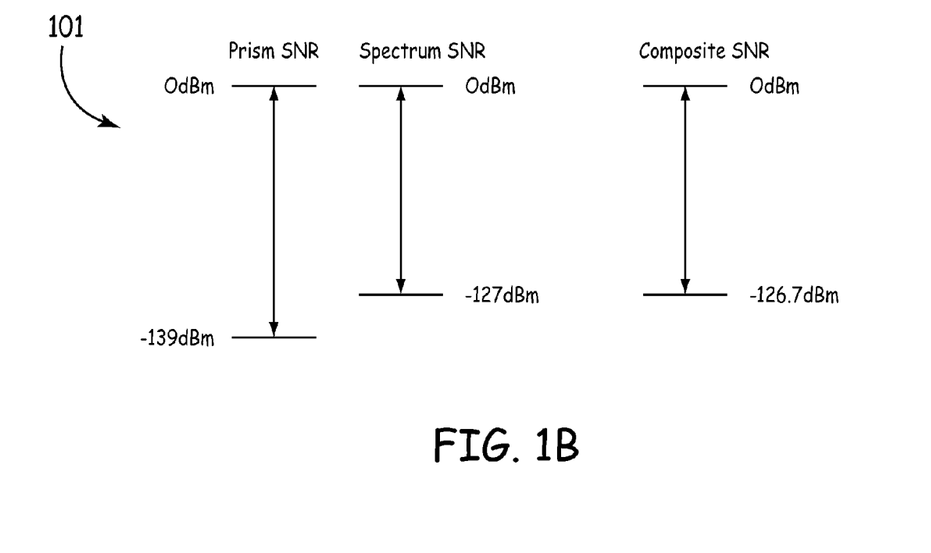
FIGS. 1B-1D are graphs illustrating SNR optimization of embodiments of the present invention.

FIG. 1A illustrates at a simple star configuration of a 2 remote antenna unit (RAU) distributed antenna system (DAS) 100 of one embodiment of the present invention. DAS 100 comprises a first RAU 110 and a second RAU 115 coupled in a star configuration with a host unit 105. DAS 100 is non-homogenous DAS in that RAU 110 and RAU 115 have differing performance characteristics from each other, as illustrated by the parameters in Table 1, below. In the embodiment shown in FIG. 1, RAU 110 comprises a "Prism Remote" RAU while RAU comprises a "Spectrum HUB" RAU, both manufactured by ADC Telecommunications, Inc. One of ordinary skill in the art would appreciate that the selection of these two RAUs are arbitrary and for illustration purposes only, and that the scope of Embodiments of the present invention is not limited to DASs comprising only these particular makes of RAUs.

with respect to each other, before they are summed. FIG. 1B illustrates the noise powers of a Prism RAU 110, Spectrum RAU 115, and a composite signal, generally at 101. The noise power of the single Spectrum RAU 115 system is 12 dB higher than the Prism RAU 110, and since the peak output power (also referred to herein as the composite maximum host peak power) at the host unit 110 is fixed at 0 dBm, the SNR is 12 dB lower for Spectrum RAU 115. Furthermore, if the uplink signals from the two RAUs 110 and 115 are simply added, the overall dynamic range of the system is reduced to 126.7 dB as shown in column three of Table 1. In this scenario, the Spectrum RAU 115's portion of the simulcast dominates the total system dynamic range of the composite signal.

TABLE 1

| RAU 110 (Prism) | RAU 115 (Spectrum) | Composite |
|---|---|---|
| Prism NF UL = 5 dB | Spectrum NF UL = 17 dB | |
| Prism Gain UL = 30 dB | Spectrum Gain UL = 30 dB | |
| Prism max peak host output power = 0 dBm | Spectrum max peak host output power = 0 dBm | Composite max peak host output power = 0 dBm + 0 dBm = 3 dBm (clipped to 0 dBm by the host) |
| kTB (B = 1 Hz) = −174 dBm | kTB (B = 1 Hz) = −174 dBm | |
| Prism Noise Pwr UL = −174 + 30 + 5 = −139 dBm/Hz | Spectrum Noise Pwr UL = −174 + 30 + 17 = −127 dBm/Hz | Prism Noise Pwr + Spectrum Noise Pwr UL = −139 dBm/Hz + −127 dBm/Hz = −126.7 dBm/Hz |
| Prism SNR (1 Hz) = 0 − (−139) = 139 dB | Spectrum SNR (1 Hz) = 0 − (−127) = 127 dB | SNR (1 Hz) = 0 − (−126.7) = 126.7 dB |

Figure 1C:
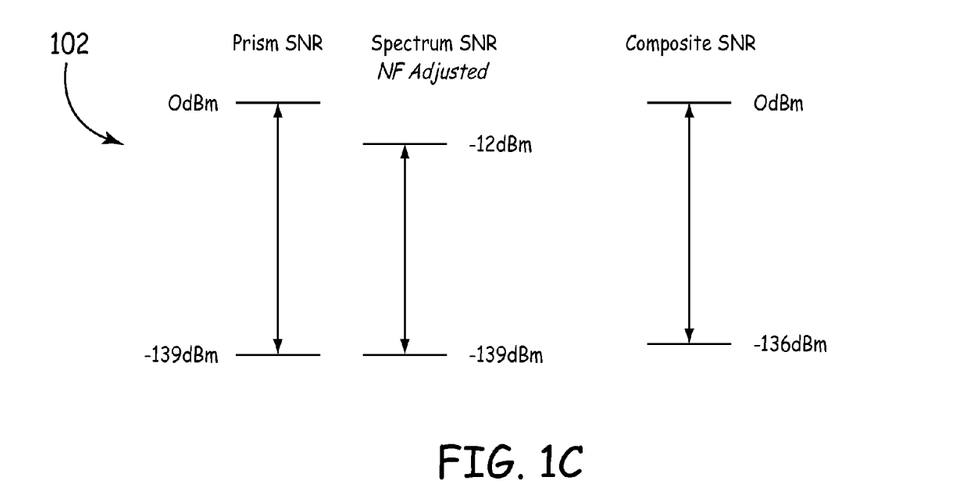

For both the Prism RAU 110 and the Spectrum RAU 115, the uplink gains are fixed at 30 dB. For the purposes of this discussion, it is assumed that overflow, caused when both RAUs 110 and 115 are operating near max power, is handled by truncation or clipping at the host unit 105. For this example, the gain of the summed composite signal at the host unit 105 can be adjusted between 0 dB and 30 dB, but the individual gains of the RAUs 110 and 115 are not adjusted As opposed to simply adding the uplink signals from the two RAUs 110 and 115, the DAS 100's total dynamic range can instead be preserved by normalizing the noise power of Spectrum RAU 115 to the noise power of the Prism RAU 110, in this case, by subtracting 12 dB of gain (the difference in noise figure) from the Spectrum RAU 115 signal. The result is illustrated in FIG. 1C generally at 102 and Table 2, below.

TABLE 2

| RAU 110 (Prism) | RAU 115 (Spectrum) Noise power normalized to Prism RAU 110 | Composite |
|---|---|---|
| Prism NF UL = 5 dB | Spectrum NF UL = 17 dB | |
| Prism Gain UL = 30 dB | Spectrum Gain UL normalized = 30 dB − 12 dB = 18 dB | |
| Prism max peak host output power = 0 dBm | Spectrum max peak host output power = 0 dBm − 12 dB = −12 dBm | Composite max peak host output power = 1 mW + .063 mW = 0.2653 dBm (clipped to 0 dBm by the host) |
| kTB (B = 1 Hz) = −174 dBm | kTB (B = 1 Hz) = −174 dBm | |
| Prism Noise Pwr UL = −174 + 30 + 5 = −139 dBm/Hz | Spectrum noise power UL normalized = −174 + 18 + 17 = −139 dBm/Hz | Prism Noise Pwr + Spectrum Noise Pwr UL normalized = −139 + −139 = −136 dBm/Hz |
| Prism SNR (1 Hz) = 0 − (−139) = 139 dB | Spectrum SNR (1 Hz) = −12 − (−139) = 127 dB | SNR (1 Hz) = 0 − (−136) = 136 dB |

With the Prism and Spectrum RAUs 110 and 115 normalized for equivalent noise power, the gain of each contributing RAU is scaled by the following equation, to stay under the 0 dBm composite max power of the host unit 105.

Scaling factor=[1 mW/Theoretical Composite Power (*W*)], or [0 dBm−Theoretical Composite Power dBm]

For this example, the Theoretical Composite Output Power is 0.2653 dBm. For the values of Table 2, this yields a scaling factor of −0.2653. Applying this scaling factor to RAUs 110 and 115 produces the results illustrated in FIG. 1D at 103 generally and Table 3, below.

TABLE 3

| RAU 110 (Prism) With scaling factor of −0.2653 dB applied | RAU 115 (Spectrum) Noise power normalized to Prism RAU 110 and with scaling factor of −0.2653 dB applied | Composite |
| --- | --- | --- |
| Prism NF UL = 5 dB Prism Gain UL = 30 dB − .2653 dB = 29.734 dB | Spectrum NF UL = 17 dB Spectrum Gain UL normalized = 30 dB − 12 dB − .2653 dB = 17.734 dB | |
| Prism max peak host output power = −.2657 dBm | Spectrum max peak host output power = −12.266 dBm | Composite max peak host output power = −.2653 dBm + −12.2653 dBm = 0 dBm |
| kTB (B = 1 Hz) = −174 dBm Prism Noise Pwr UL = −174 + 29.73 + 5 = −139.266 dBm/Hz | kTB (B = 1 Hz) = −174 dBm Spectrum noise power UL normalized = −174 + 18 + 17 = −139.265 dBm/Hz | Prism Noise Pwr + Spectrum Noise Pwr UL normalized = −136.255 dBm/Hz |
| Prism SNR (1 Hz) = 0 − (−139) = 139 dB | Spectrum SNR (1 Hz) = −12 − (−139) = 127 dB | SNR (1 Hz) = 0 − (−136) = 0 − (−136.265) = 136.255 dB |

For this example, the composite SNR of the DAS 100 was improved from the 127 dB (using the straight summation illustrated in FIG. 1A and Table 1) to 136.26 dB.

Figure 1D:
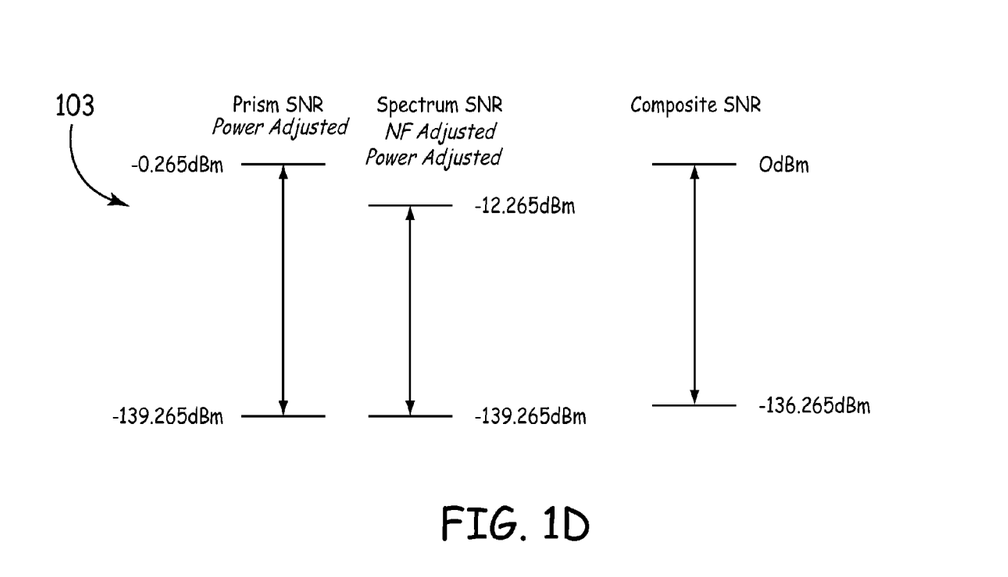
Figure 2:
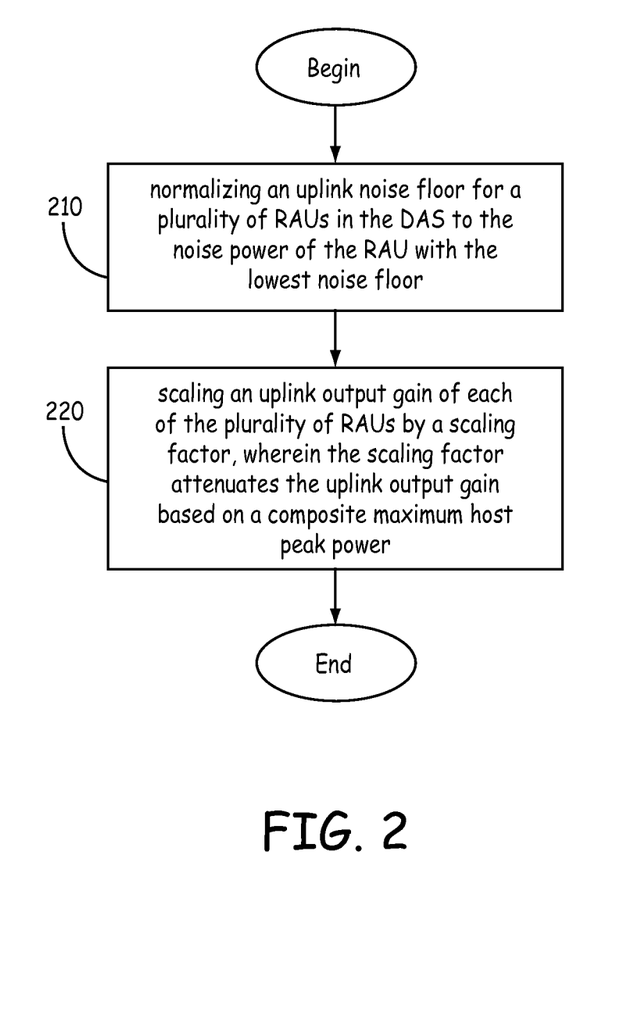
FIG. 2 is a flow chart illustrating a method of one embodiment of the present invention.

FIG. 2 is a flow chart illustrating the above method for providing optimal SNR summation. Applied to the DAS 100 of FIG. 1A, this method preserves the individual SNR of both the Prism RAU 110 and the Spectrum RAU 115, and normalizes the noise floor of the two RAUs such as to maximize SNR for the simulcast. The method begins at 210 with normalizing an uplink noise floor for a plurality of RAUs in the DAS to the noise power of the RAU with the lowest noise floor. That is, the noise power of the RAU with the lowest noise floor defines the noise floor normalization value. This process is discussed above with respect to FIG. 1C. The method proceeds to 220 with scaling an uplink output gain of each of the plurality of RAUs by a scaling factor, wherein the scaling factor attenuates the uplink output gain based on a composite maximum host peak power. The "composite maximum host peak power" or alternatively "composite max peak host output power" as those terms are defined for this disclosure, refer to the peak power that the host unit is designed to expect to receive from the composite uplink signal from the RAUs. For example, in the embodiments discussed above with respect to FIGS. 1A-1D, the host unit 105 is designed to handle a composite uplink signal having a maximum peak power of 0 dBm. The composite maximum host peak power for host unit 105 is therefore 0 dBm. The theoretical maximum power of the composite uplink signal after the normalization performed at 210 is 0.2653 dBm as indicated in Table 2. Accordingly, the scaling factor that would be applied at 220 is 0 dBm−0.2653 dBm which is a scaling factor of −0.2653. Applying this scaling factor to the normalized RAUs will ensure that the 0 dBm composite power of the host is not exceeded.

In one embodiment, the calculations for normalizing the uplink noise floor and for scaling the uplink output gains are calculated at the host unit and the results are pushed down to the RAUs via the DAS 100 network. The RAUs adjust the gain of the digital samples of the wireless RF signals they each receive prior to their summing into the composite, as discussed in more detail below. The actual gain adjustment performed by each RAU type will be different. For example, the Prism RAU 110 is adjusted by the scaling factor, but does not need to be normalized as it is already the RAU with the lowest noise floor. Therefore, the total gain adjustment performed at the Prism RAU 110 is an attenuation of 0.2653 dB, bringing the RAU 110's uplink gain from 30 dB to 29.734 dB. In contrast, the Spectrum RAU 115 is adjusted by the scaling factor, but also needs to be normalized. Therefore, the total gain adjustment performed at the Spectrum RAU is an attenuation of −12 dB−0.2653 dB, bringing the RAU 115's uplink gain from 30 dB to 17.734 dB. Accordingly, in one embodiment, the host unit pushes to RAU 110 gain adjustment information to set the RAU 110's uplink gain to 29.734 dB, and different gain adjustment information to RAU 115 to set RAU 115's uplink gain to 17.734 dB.

The embodiment described with DAS 100 included only two RAUs. One distinct benefit of the embodiments of the present invention is that they can be utilized to calculate a scaling factor, as well as the individual performance parameters, for a DAS having any number of RAUs and for any simulcast topology, using the Equations 300 provided in FIG. 3 with knowledge of the parameters defined in Table 4, below.

TABLE 4

| Parameter | Definition |
| --- | --- |
| Max_Host_Pwr_dBm | DAS Host Unit Maximum Power (dBm) |
| RAU1 | Number of RAUs of a first type in the |

TABLE 4-continued

| Parameter | Definition |
|---|---|
|  | simulcast (for example, the number of Prism Remote Antenna Units) |
| NF_RAU1 | Noise figure of an RAU1 (typically 5 for a Prism Remote) |
| Gain_RAU1_dB | Pre digital summation uplink gain of an RAU1 type RAU (For a prism RAU, typically 30 dB or 36 dB) |
| RAU2 | Number of RAUs of a second type in the simulcast (for example, the number of Spectrum Remote Antenna Units) |
| NF_RAU2 | Noise figure of an RAU2 (typically 17 for an 8-Spectrum RAU summation) |
| Gain_RAU2_dB | Pre digital summation uplink gain of an RAU2 type RAU (For a Spectrum RAU, typically 30 dB) |

Figure 4:
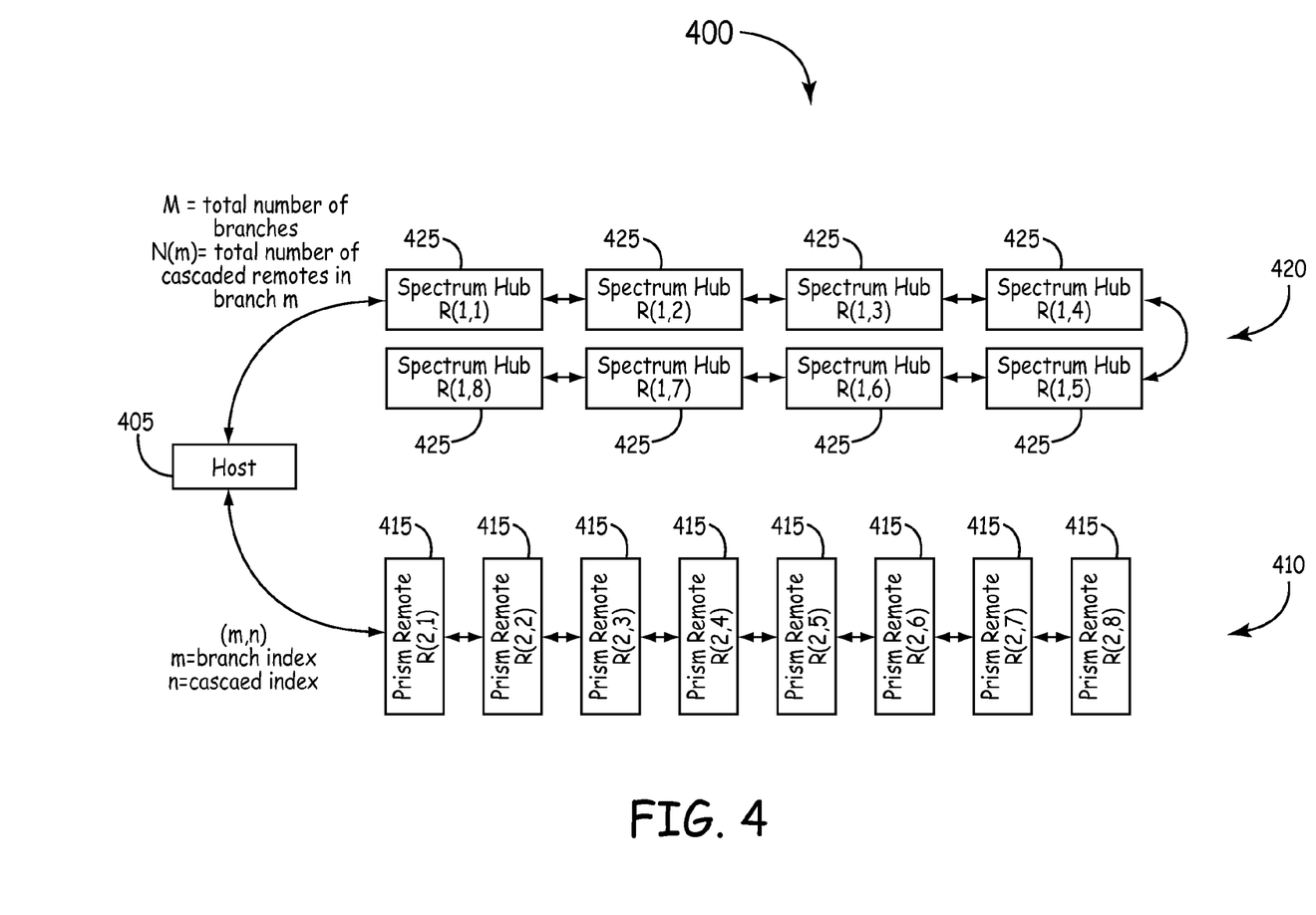
FIG. 4 illustrates one configuration of remote antenna units for a distributed antenna system of one embodiment of the present invention.

FIG. 4 is a block diagram illustrating a DAS 400 of one embodiment of the present invention having 8 Prism RAUs (shown generally at 415) in a first cascade (shown generally at 410) and 8 Spectrum RAUs (shown generally at 425) in a second cascade (shown generally at 420) coupled to a host unit 405. Using the method described in FIG. 2, optimal SNR summation for the uplink simulcast is achieved by normalizing the noise power and scaling for maximum output power. For DAS 400, values for the parameters of Table 4 are shown in Table 5 where RAU1 represents the Prism type RAUs 415 and RAU2 represents the Spectrum type RAUs 425.

TABLE 5

| Parameter | Value |
|---|---|
| Max_Host_Pwr_dBm | 0 |
| RAU1 | 8 |
| NF_RAU1 | 5 |
| Gain_RAU1_dB | 30 |
| RAU2 | 8 |
| NF_RAU2 | 17 |
| Gain_RAU2_dB | 30 |

By applying the Equations in FIG. 3 to the values of Table 5, the values shown below in FIG. 6 are derived.

TABLE 6

| | | | |
|---|---|---|---|
| Max_Host_Pwr_W | 0.001 | RAU2_Gain_adj_dB | 8.7034 |
| NF_RAU2_RAU1_delta | 12 | RAU2_Max_Pwr_dBm | −21.2966 |
| Max_Comp_Pwr_W | 0.0085 | RAU2_Noise_Pwr_dBm | −148.2966 |
| Max_Comp_Pwr_dBm | 9.2966 | RAU2_SNR_dB | 127 |
| Host_Pwr_W | 0.001 | RAU1_Gain_adj_dB | 20.7034 |
| Host_Pwr_dBm | 0 | RAU1_Max_Pwr_dBm | −9.2966 |
| Host_Noise_Pwr_W | 2.3684e−017 | RAU1_Noise_Pwr_dBm | −148.2966 |
| Host_Noise_Pwr_dBm | −136.2554 | RAU1_SNR_dB | 139 |
| System_SNR_dB | 136.2554 | | |

As indicated in Table 6, the gain adjustments that will achieve optimal SNR summation for the uplink simulcast are a gain adjustment of 20.70337637411954 dB at each RAU1 type RAU, and a gain adjustment of 8.70337637411954 dB at each RAU2 type RAU for DAS 400. That is, each of the Prism RAUs 415 will attenuate the wireless RF signal they receive by 20.70337637411954 dB, prior to summing the digital RF samples into the cascade 420's composite signal. Similarly, each of the Spectrum RAUs 425 will attenuate the wireless RF signal they receive by 8.70337637411954 dB, prior to summing the digital RF samples into cascade 420's composite signal. The composite uplink signal at the host from both cascades 410, 420 will not exceed 0 dBm. In one embodiment, the calculations are performed at the host unit 405, and the appropriate gain adjustments are pushed to each of the RAUs 415, 425 in DAS 400.

Figure 3:
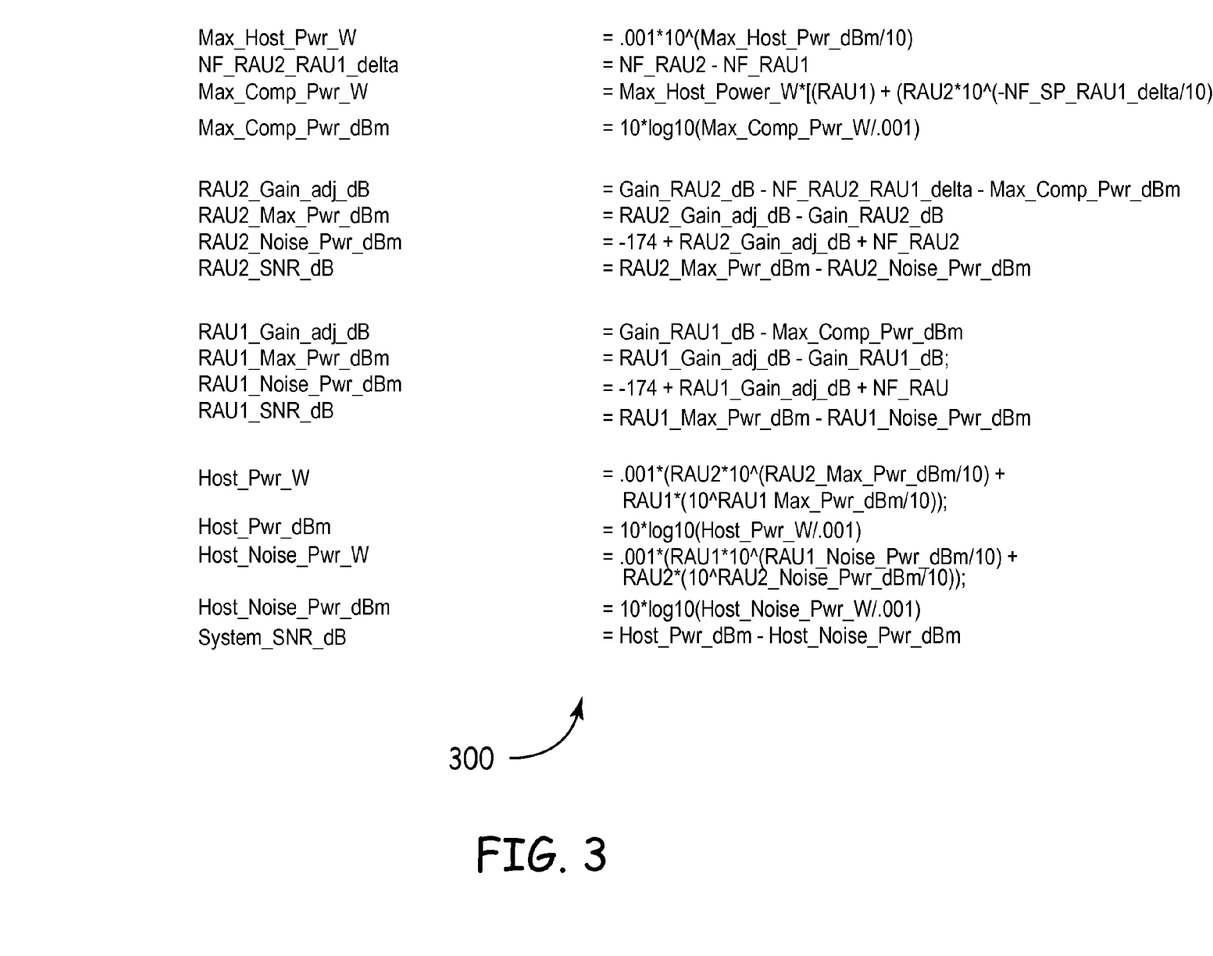
FIG. 3 provides a chart of equations for implementing one embodiment of the present invention.
Figure 5:
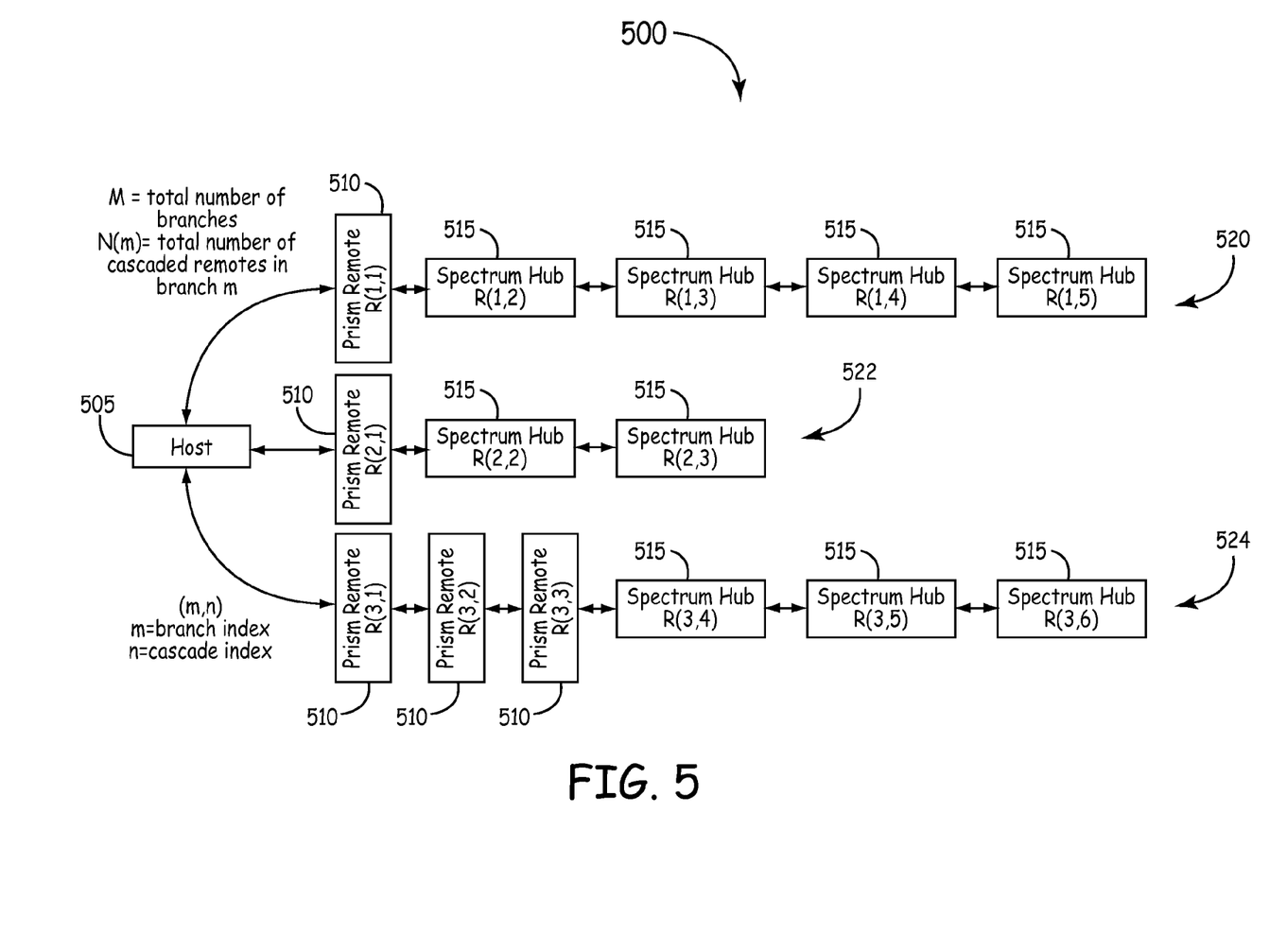
FIG. 5 illustrates one configuration of remote antenna units for a distributed antenna system of one embodiment of the present invention.

The method of FIG. 2 and equations provided in FIG. 3 are applicable to any hybrid DAS configuration that includes two different types of RAUs. For example, FIG. 5 is a block diagram illustrating another DAS 500 having Prism RAUs 510 and Spectrum RAUs 515 coupled to a host unit 505 via the shared cascades shown generally at 520, 522 and 524. Using the equations of FIG. 3, optimal SNR summation for the uplink simulcast is achieved by normalizing the noise power and scaling for maximum output power. For DAS 500, the values for the parameters of Table 4 are shown in Table 7 where RAU1 represents the Prism type RAUs 510 and RAU2 represents the Spectrum type RAUs 515.

TABLE 7

| Parameter | Value |
|---|---|
| Max_Host_Pwr_dBm | 0 |
| RAU1 | 5 |
| NF_RAU1 | 5 |
| Gain_RAU1_dB | 30 |
| RAU2 | 9 |
| NF_RAU2 | 17 |
| Gain_RAU2_dB | 30 |

By applying the Equations in FIG. 3 to the values of Table 7, the values shown below in FIG. 8 are derived.

TABLE 8

| | | | |
|---|---|---|---|
| Max_Host_Pwr_W | 0.001 | RAU2_Gain_adj_dB | 10.5431 |
| NF_RAU2_RAU1_delta | 12 | RAU2_Max_Pwr_dBm | −19.4569 |
| Max_Comp_Pwr_W | 0.0056 | RAU2_Noise_Pwr_dBm | −146.4569 |
| Max_Comp_Pwr_dBm | 7.4569 | RAU2_SNR_dB | 127 |
| Host_Pwr_W | 0.001 | RAU1_Gain_adj_dB | 22.5431 |
| Host_Pwr_dBm | 0 | RAU1_Max_Pwr_dBm | −7.4569 |
| Host_Noise_Pwr_W | 3.1655e−017 | RAU1_Noise_Pwr_dBm | −146.4569 |

TABLE 8-continued

| Host_Noise_Pwr_dBm | −134.9956 | RAU1_SNR_dB | 139 |
| System_SNR_dB | 134.9956 | | |

As indicated in Table 8, the gain adjustments that will achieve optimal SNR summation for the uplink simulcast are a gain adjustment of 22.5431 dB at each RAU1 type RAU, and a gain adjustment of 10.5431 dB at each RAU2 type RAU for DAS 500. That is, each of the Prism RAUs 510 will attenuate the wireless RF signal they receive by 7.4569 dB, prior to summing the digital RF samples with uplink signal received from the previous RAU in the cascade. Similarly, each of the Spectrum RAUs 515 will attenuate the wireless RF signal they receive by 19.4569 dB, prior to summing the digital RF samples with uplink signal received from the previous RAU in the cascade. Whether the previous RAU in the cascade is a Prism RAU or Spectrum RAU makes no difference to the summation process performed at each RAU because the RF signals digitized at each RAU are pre-scaled as dictated by their assigned gain adjustments prior to summation.

Figure 6:
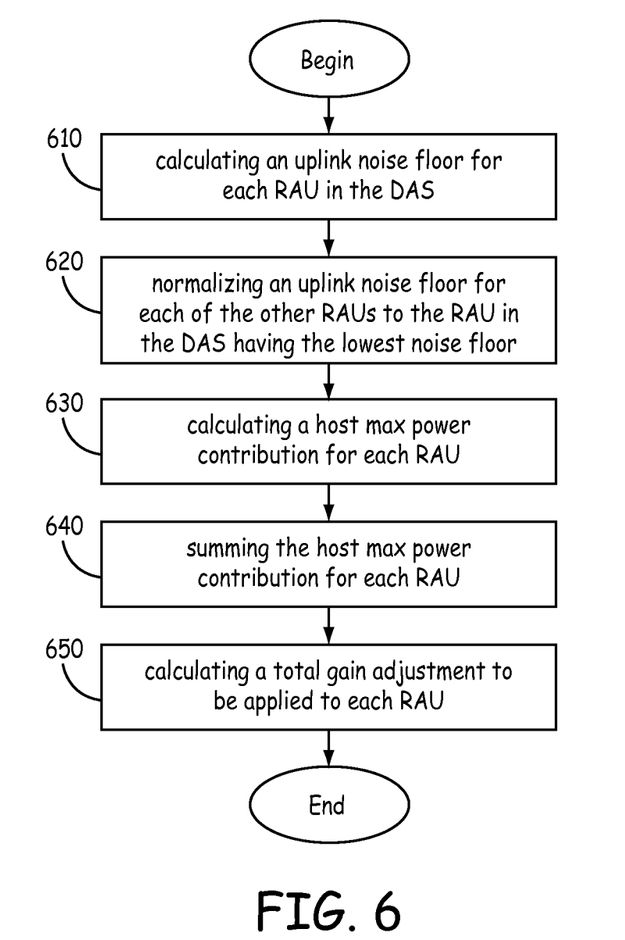
FIG. 6 is a flow chart illustrating a method of one embodiment of the present invention.

The embodiments described above for normalizing the uplink noise floor and for scaling the uplink output gains are applicable to a DAS having any simulcast topology that comprises two different types of RAUs having different operating parameter. Building on the Spectrum/Prism examples above, FIG. 6 present a reverse summation method for a DAS having any number of different RAU types. This method also substantially preserves the dynamic range of the uplink simulcast.

The method begins at 610 with calculating an uplink noise floor for each RAU in the DAS. Assuming a maximum peak composite uplink signal at the host unit of 0 dBm, the uplink noise floor can be calculated for any remote "N" in the DAS using the equation:

Remote_UL_Noise_Floor_$N$=−174+$XN$+$YN$

Wherein XN is the Remote Uplink Gain for remote "N", and YN is the Remote Uplink Noise Factor for remote "N".

The method proceeds to 620 with normalizing an uplink noise floor for each of the other RAUs to the RAU in the DAS having the lowest noise floor. The noise power of the RAU with the lowest noise floor establishes the noise floor normalization value. Assuming that Remote #1 has the lowest noise floor, the uplink noise floor for all other remote antenna units will be normalized to Remote #1. For example, given that for Remote #1

Remote_UL_Noise_Floor_1=−174+$X1$+$Y1$ then any other remote "N" in the DAS will be normalized using the relationship:

Remote_Floor_Atten_$N$_dB=Remote_UL_Noise_Floor_1−Remote_UL_Noise_Floor_$N$

The method proceeds to 630 with calculating a host max power contribution for each RAU and to 640 with summing the host max power contribution for each RAU. The host max power contribution can be calculated for any remote "N" in the DAS using the equations:

Remote_$N$_Max_Power_dBm=Max_Host_Power_dBm−Remote_Floor_Atten_$N$_dB

Remote_$N$_Max_Power_$W$=0.001*10^(Remote_$N$_Max_Power_dBm/10)

The theoretical maximum power of the composite uplink signal is calculated using the equations:

Composite_Host_Pwr_$W$=sum[Remote_1_Max_Power_$W$:Remote_$N$_Max_Power_$W$]

Composite_Host_Pwr_dBm=10*log 10 (Composite_Host_Pwr_$W$/0.001)

The method proceeds to 650 with calculating a total gain adjustment to be applied to each RAU. The total gain adjustment to be applied to any remote "N" in the DAS can be calculated using the equation:

Remote_$N$_Attenuation=[(Composite_Host_Pwr_dBm−Max_Host_Pwr_dBm)+Remote_Floor_Atten_$N$_dB]

where Max_Host_Pwr_dBm, the maximum peak composite uplink signal at the host unit, was defined as 0 dBm above.

In one embodiment of the method, the calculation discussed above for normalizing the uplink noise floor and for scaling the uplink output gains are calculated at the DAS host unit and the results are pushed down to the RAUs via the DAS network. An RAU in the DAS will adjust its gain for digital samples of wireless RF signals it received based on the Remote_N_Attenuation value provided to that RAU by the DAS host unit.

Figure 7:
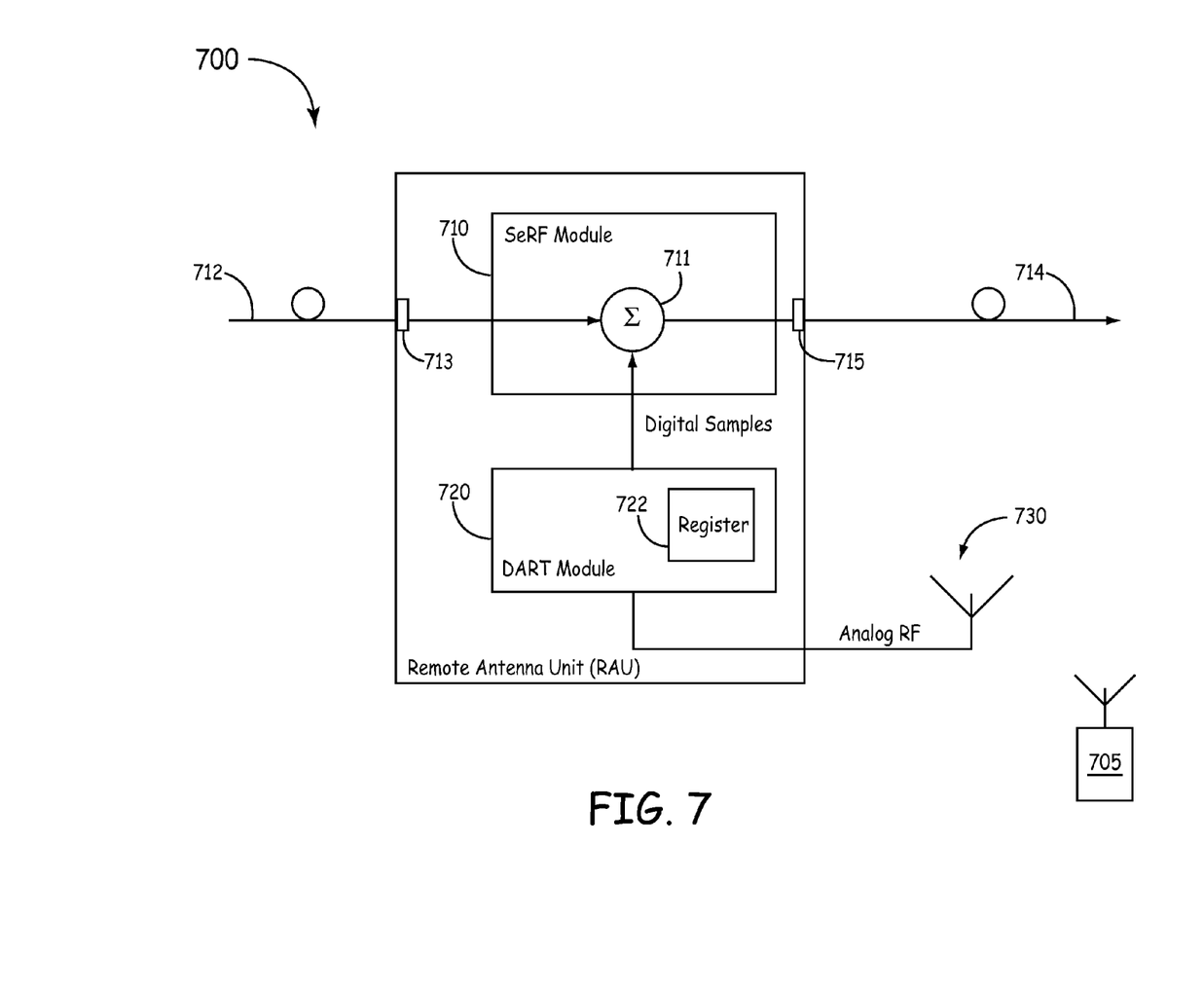
FIG. 7 is a block diagram illustrating a remote antenna unit of one embodiment of the present invention.

To better illustrate the attenuation and summation processed performed by each RAU, FIG. 7 provides a simplified block diagram for an RAU 700 of one embodiment of the present invention. RAU 700 includes a serial radio frequency (SeRF) module 710, a digital to analog radio frequency transceiver (DART) module 720 and at least one antenna 730. In alternate embodiments, SeRF module 710 and DART module 720 described herein are realized using a Field Programmable Gate Array (FPGA), an Application-Specific Integrated Circuit (ASIC), a digital signal processing (DSP) board, or similar devices and combinations thereof. RAU 700 is configured within a cascade of RAUs within a DAS such that is coupled to another RAU via an incoming fiber link 712 (coupled to incoming signal interface 713) and via an outgoing fiber link 714 (coupled to outgoing signal interface 715) to either yet another RAU in the cascade, or directly to the DAS host unit.

DART module 720 provides bi-directional conversion between analog RF signals and digital RF samples. In the uplink, antenna 730 receives a wireless RF signal (from a handheld subscriber unit 705, for example) and passes the RF signal to DART module 720. DART module 208 receives the incoming analog RF signal, samples the analog RF signal, and generates a stream of digital RF samples which are provided to SeRF module 710. One of ordinary skill in the art upon reading this specification would appreciate that the term "digital RF samples" would, in one or more alternate embodiments, include samples of the incoming analog RF signal converted into intermediate frequency (IF) samples.

For the purpose of discussing embodiments of the present invention, the purpose of SeRF module 710 is to receive digital RF samples via incoming fiber 712 and sum those digital RF samples directly at the fiber level (using a summer 711, for example) with the digital RF samples provided by the DART module 720. The resulting sum is transmitted via outgoing fiber link 714. Accordingly, for each RAU within the DAS, the corresponding SeRF module is adding the data from the RAU before it in the cascade to the digital RF samples produced by its own DART module. It is not necessary for the SeRF module 710 to have knowledge of the structure of the overall DAS. It just inputs from the fiber 712, sums the digital RF samples from the fiber 712 with the digital RF samples from DART module 720, and outputs the result via fiber 714. For clarification, as the terms are used herein, "adding" and "summing" do not imply that the SeRF simply multiplexes the two streams of RF samples into a single stream. Instead, at summer 711, the value of an RF sample received via the fiber 712 is added to the value of an RF sample received from the DART module 720 to produce a new "summed" RF data sample output. Such adding of the data signals can be performed when the digital RF samples from DART module 720 have the same sample rate as the digital RF samples from fiber 712, to which they are being added.

In one embodiment, normalization and application of the scaling factor are performed digitally at the DART module 720 level, so there is no need for a physical attenuator within RAU 700. In one embodiment, the attenuation is implemented via a multiplier directly in the signal path within the DART module 720. Using either of the methods described in FIG. 2 or FIG. 6, gain adjustments that will achieve optimal SNR summation for the uplink simulcast are calculated at the host unit. The gain adjustment for RAU 700 is pushed by the host unit to RAU 700, where it is stored within a register 722 of DART module 720 as a multiplier. As DART module 720 samples the wireless RF signals, it applies the multiplier stored in register 722 to the result before passing the result to SeRF module 710.

In alternate embodiment, the host units associated with the FIGS. 1-7 above include "plug-and-play" technology such that when a new RAU is added to the DAS, the host unit will detect the addition, obtain the information needed to calculate it's uplink noise floor, and recalculate the gain adjustments for each of the RAUs. Pushing out the new gain adjustment values for implementation can be performed automatically or initiated through a manual process by the network operator. Further, nothing in the methods described above prevents the network operator from overriding the gain adjustment calculated by the host unit for one or more of the RAUs by specifying a user defined attenuation for those one or more RAUs.

Although the optimal SNR summation methods described above provide a means for controlling the composite signal power at the host unit, digital overflow can still occur when data streams are added together, for example, by an RAU SeRF Module, or at the host unit. This is because the digital RF samples are representations of voltage values rather than power values. For example, returning to DAS 100 in FIGS. 1A and 1B, assume that both RAU 110 and RAU 115 are operating at max power for a particular band, and no dynamic range optimization is applied. Further assume that each RAU 110 and RAU 115 utilize a DART module that applies a 16-bit analog-to-digital conversion of the incoming wireless RF signal and that, the maximum code that will be output is 1.5 dB lower than the maximum possible output value of $2^{16}$. The resulting maximum adjusted value would be 55140. Under the worst case scenario, a 55140 value is output from each DART module at the same time interval. These two values will be added at the host unit 105, generating a 17-bit result of 110280. Because the digital-to-analog converter, which re-creates this digitized code, is a 16-bit device, the summation creates an overflow condition of 1 bit, which can only be handled by saturation to return the result back to 16 bits=65535. This operation clips the magnitude of the waveform, causing distortion, as well as an amplitude drop for overflow samples, in this case, of 4.5 dB.

In contrast, when SNR optimization is applied as described in FIGS. 1C and 1D, RAU 110 operates at a max power of −0.265 dBm, or a max scale voltage code of 53479 out of its DART module. RAU 115 operates at a max power of −12.365 dBm or a max scale voltage code of 13433. When these two code values are added at the host unit 105, a 17-bit result of 66912 is generated, which is also handled by saturation to return the result back to 16 bits=65535. In this situation, the max amplitude is still saturated and clipped, but not as severely. Here only 0.18 dB of amplitude is clipped vs. the 4.5 dB found in the example without SNR optimization. One should note that this composite amplitude occurs only when both remote antenna units are at maximum power, and both samples are phased such that their voltages are at max code at the same sampling time interval. The probability of this occurring is extremely small, and it is not likely that this event will persist for very long.

A further example is provided by considering an overflow condition of the dual-cascade network shown in FIG. 4, with SNR optimization applied. Again assuming that each RAU in DAS 400 applies a 16-bit analog-to-digital conversion to incoming wireless RF signals, each Spectrum RAU 425 will have a max code of 4749, and each Prism RAU 415 will have a max code of 18908. The two cascades 410 and 420 add separately, and are summed together by the host unit 405. For cascade 410, the total code value of all 8 remote antenna units would be 8*18908, or 151264, if all remote antenna units were seeing a max code at the same time. This is a 7.24 dB overflow condition. For cascade 420, we have 8*4749, or 37992. Cascade 420 does not exhibit overflow, but when the cascades 410 and 420 are added together, the output remains saturated at 16 total bits. This condition would only occur with all 16 remote antenna units at max code, which is not a real-world operating situation. Considering a worst-case real-world scenario of 2 Prism RAUs and 4 Spectrum RAUs at max scale, the host unit would see 2*18908+4*4749=56812. This is under the 65535 saturation limit, and therefore no clipping occurs.

Because some RAUs in a DAS may be much more likely to see a full-scale input (for example, an RAU located within a building is likely closer to mobile units, as compared to an outdoor RAU, which would typically be located much further away from mobile units) a network operator may elect to overriding the gain adjustment calculated by the host unit by specifying a user defined attenuation for those RAUs.

Several means are available to implement the systems and methods of the embodiments of the current invention as discussed in this specification. In addition to any means discussed above, these means include, but are not limited to, digital computer systems, microprocessors, programmable controllers, field programmable gate arrays (FPGAs) and application-specific integrated circuits (ASICs). Therefore other embodiments of the present invention are program instructions stored and resident on physical computer readable media devices which when implemented by such means, enable them to implement embodiments of the present invention. Computer readable media include devices such as any physical form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for reverse path summation for a distributed antenna system, the method comprising:
    normalizing an uplink noise floor for a plurality of remote antenna units of a distributed antenna system, the plurality of remote antenna units including at least a first remote antenna unit having a first noise floor that is the lowest noise floor of any of the plurality of remote antenna units, wherein the uplink noise floor of each of the plurality of remote antenna units is normalized based on the first noise floor that is the lowest noise floor of any of the plurality of remote antenna units, wherein normalizing the uplink noise floor for the plurality of remote antenna units includes adjusting the noise power of each of the plurality of remote antenna units to match the first noise floor that is the lowest noise floor of the any of the plurality of remote antenna units, wherein the lowest noise floor is a performance characteristic of the at least a first remote antenna unit having a lowest noise power; and
    scaling an uplink output gain of each of the plurality of remote antenna units by a scaling factor, wherein the scaling factor adjusts the uplink output gain based on a composite maximum host peak power for a host unit coupled to the plurality of remote antenna units, wherein the scaling factor is the same for each remote antenna unit of the plurality of remote antenna units, wherein the scaling factor changes when there is a change in a number of remote antenna units in the plurality of remote antenna units;
    wherein the normalizing and scaling are performed at at least one antenna unit of the plurality of remote antenna units by adjusting a gain of digital samples generated from wireless RF signals received by the at least one antenna unit, prior to summing of said digital samples with other digital samples received at the at least one remote antenna unit.

2. The method of claim 1, wherein the normalizing and scaling further comprising sending a gain adjustment value to a second remote antenna unit of the plurality of remote antenna units.

3. The method of claim 2, wherein the gain adjustment value instructs the second remote antenna unit to adjust a gain of digital samples generated from wireless RF signals received by the second remote antenna unit, prior to summing of said digital samples with other digital samples received at the second remote antenna unit.

4. The method of claim 1, wherein the plurality of remote antenna units are non-homogenous with respect to performance parameters.

5. The method of claim 1, wherein normalizing the uplink noise floor for the plurality of remote antenna units of the distributed antenna system further comprises:
    attenuating an uplink gain for a second remote antenna unit of the plurality of remote antenna units based on a difference between an uplink noise floor for the second remote antenna unit and an uplink noise floor value for the first remote antenna unit.

6. The method of claim 1, further comprising:
    calculating an uplink noise floor for each of the plurality of remote antenna units.

7. The method of claim 1, further comprising:
    calculating a maximum power contribution value for each of the plurality of remote antenna units; and summing each maximum power contribution value for the plurality of remote antenna units to derive a theoretical composite host power value.

8. The method of claim 7, further comprising:
calculating a total gain adjustment value for a second remote antenna unit of the plurality of remote antenna units based on a function of the maximum power contribution value for the second remote antenna unit and the theoretical composite host power value.

9. The method of claim 8, further comprising:
sending the total gain adjustment value for the second remote antenna unit to the second remote antenna unit.

10. The method of claim 9, wherein the total gain adjustment value instructs the second remote antenna unit to adjust a gain of digital samples generated from wireless RF signals received by the second remote antenna unit, prior to summing of said digital samples with other digital samples received at the second remote antenna unit.

11. The method of claim 1, wherein the host unit is coupled to the plurality of remote antenna units by a fiber network.

12. A remote antenna unit for a distributed antenna system having a plurality of remote antenna units, the remote antenna unit comprising:
a first module coupled to at least one antenna, the first module including a converter that digitally samples a wireless RF signal received at the at least one antenna to produce a first stream of digital samples;
a second module coupled to the first module and an incoming signal interface, the second module including a summer that produces a composite signal by summing digital samples from the first stream of digital samples with digital samples based on a second stream of digital samples received via the incoming signal interface;
wherein the first module adjusts a gain of the first stream of digital samples by a first factor that normalizes a first uplink noise floor for the remote antenna unit based on a noise floor normalization value established for the distributed antenna system to match a lowest noise floor of all of the plurality of remote antenna units of the distributed antenna system, wherein the lowest noise floor is a performance characteristic of a remote antenna unit having a lowest noise power of all of the plurality of remote antenna units of the distributed antenna system;
wherein the first module further adjusts the gain of the first stream of digital samples by a scaling factor based on a composite maximum host peak power for a host unit for the distributed antenna system, wherein the scaling factor is the same for each of the plurality of remote antenna units in the distributed antenna system, wherein the scaling factor changes when there is a change in a number of remote antenna units in the plurality of remote antenna units.

13. The remote antenna unit of claim 12, wherein the first module comprises a register that stores a total gain adjustment value, wherein the first module applies the total gain adjustment value to the first stream of digital samples to adjust the gain of the first stream of digital samples by the factor that normalizes the uplink noise floor and the scaling factor.

14. The remote antenna unit of claim 13, wherein the first module receives the total gain adjustment value via a communication from the host unit.

15. The remote antenna unit of claim 12, wherein the second module is coupled to at least one other remote antenna unit over a fiber network via the incoming signal interface, wherein the second stream of digital samples is generated by the at least one other remote antenna unit.

16. A distributed antenna system having optimized reverse path summation, the distributed antenna system comprising:
a host unit;
a plurality of remote antenna units coupled to the host unit including at least a first remote antenna unit having a first noise that is the lowest noise floor of any of the plurality of remote antenna units;
wherein an uplink noise floor for the plurality of remote antenna units is normalized to a noise floor normalization value based on the first noise floor of the at least a first remote antenna unit that is the lowest noise floor of any of the plurality of remote antenna units, wherein the uplink noise floor for the plurality of remote antenna units is normalized such that the noise power of each of the plurality of remote antenna units is adjusted to match the first noise floor that is the lowest noise floor of any of the plurality of remote antenna units, wherein the lowest noise floor is a performance characteristic of the at least a first remote antenna unit having a lowest noise power; and
wherein an uplink output gain for each of the plurality of remote antenna units is scaled by a scaling factor that is based on a composite maximum host peak power for the host unit, wherein the scaling factor is the same for each of the plurality of remote antenna units, wherein the scaling factor changes when there is a change in a number of remote antenna units in the plurality of remote antenna units;
wherein each of the plurality of remote antenna units adjusts a gain of digital samples generated from wireless RF signals received at each respective remote antenna unit, based on the noise floor normalization value and the scaling factor, prior to summing of said digital samples with other digital samples received at each respective remote antenna unit.

17. The distributed antenna system of claim 16, wherein a first remote antenna unit of the plurality of remote antenna units comprises:
a first module coupled to at least one antenna, the first module including a converter that digitally samples a wireless RF signal received at the at least one antenna to produce a first stream of digital samples;
a second module coupled to the first module and an incoming signal interface, the second module including a summer that produces a composite signal by summing digital samples from the first stream of digital samples with digital samples based on a second stream of digital samples received via the incoming signal interface;

wherein the first module adjusts a gain of the first stream of digital samples by a factor that normalizes an uplink noise floor for the first remote antenna unit based on the noise floor normalization value;

wherein the first module further adjusts the gain of the first stream of digital samples by the scaling factor.

18. The distributed antenna system of claim 17, wherein the first module comprises a register that stores a total gain adjustment value, wherein the first module applies the total gain adjustment value to the first stream of digital samples to adjust the gain of the first stream of digital samples by the factor that normalizes the uplink noise floor and the scaling factor.

19. The distributed antenna system of claim 18, wherein the first module receives the total gain adjustment value via a communication from the host unit.

20. The distributed antenna system of claim 17, wherein the second module is coupled to at least one other remote antenna unit of the plurality of remote antenna units over a fiber network via the incoming signal interface, wherein the second stream of digital samples is generated by the at least one other remote antenna unit.

21. The distributed antenna system of claim 16, wherein the plurality of remote antenna units are non-homogenous with respect to performance parameters.

* * * * *